Sept. 14, 1965     V. WEISS ETAL     3,206,048
SHOVEL EXCAVATOR
Filed June 3, 1963
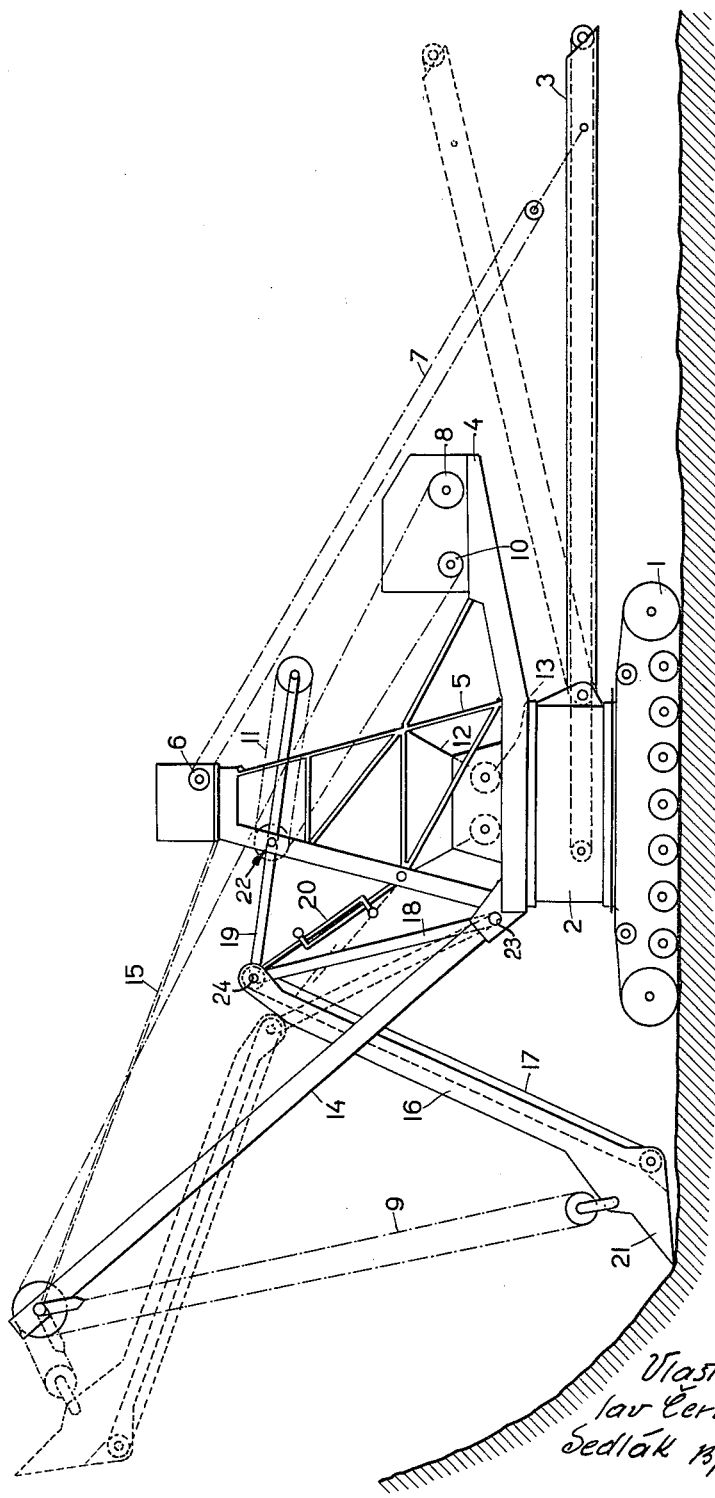
INVENTORS
Vlastimil Weiss, Ladislav Červinka, Jaroslav Sedlák

3,206,048
SHOVEL EXCAVATOR
Vlastimil Weiss, Ladislav Cervinka, and Jaroslav Sedlák, Unicov, Czechoslovakia, assignors to Unicovske strojirny narodni podnik, Unicov, Czechoslovakia
Filed June 3, 1963, Ser. No. 284,980
Claims priority, application Czechoslovakia, June 5, 1962, 3,451/62
3 Claims. (Cl. 214—90)

The present invention relates to a shovel excavator and more particularly to the transportation of the excavated material from the shovel to the place of delivery.

This invention provides an excavating machine in which the material excavated by the shovel is conveyed to a storage bin on the excavator by a power driven conveyor arranged on the boom of the shovel. A disintegrating device is arranged on the excavator for adjusting the lump size of the material before it is delivered by a discharge conveyor to the delivery site.

An embodiment of this invention is shown on the accompanying drawing in elevation. A truck 1 supports a rotatable base frame 2 to which a discharge conveyor is pivoted. A superstructure rotatably mounted on the base frame 2 comprises a platform 4 and a tower 5 on the platform 4. A jib 14 is attached to a pivot 23 on the platform 4 and held in position by cables 15 secured to the tower 5. A shovel 21 which has no rear wall is integrally attached to one end of a boom 16. The shovel 21 is suspended from a cable 9 which is guided over the top of the jib 14 to a winch 8 on the platform 4. The other end of the boom 16 is pivotally supported by a shaft 24 on the upper end of an arm 18 whose lower end is attached to the platform 4 by the pivot 23. A control beam 19 has one end pivotally attached to the shaft 24 and is slidably supported on the tower 5 in a pivot assembly 22. It is held in position by a winch 10 on the platform 4 and a cable 11. A power driven belt conveyor 17 is arranged within the boom 16 and extends over its full length. The conveyor 17 forms the bottom of the shovel 21 and terminates at the rear end of the boom 16 above a chute 20. The chute 20 bridges the variable distance between the rear end of the boom 16 and a hopper 12. The chute consists of two telescoping parts of which one is pivotally attached to the upper end of the arm 18 and the other to the tower 5 near the hopper. A crusher 13 is arranged below the hopper 12. A winch 6 on the tower 5 pivots the discharge conveyor 3 about a horizontal axis on the platform 4 by means of a cable 7.

The shovel excavator according to this invention works as follows:

The shovel 21 and the boom 16 are raised from the illustrated position by means of the cable 9, whereby the shovel is filled with excavated material. The shovel 21 is moved into the cut by the winch 10 by means of the cable 11 and the control beam 19 whereby the rear end of the boom 16 moves in a circular arc about the pivot 23 of the arms 18. The movement of the shovel 21 under the combined action of the winch 8 and the winch 10 determines the thickness of the cut of excavated material and the profile of the worked slope. The material excavated by the shovel 21 is taken from the shovel 21 by the conveyor 16 to the chute 20 from which it is dropped into the hopper 12. The intermittently received excavated material is discharged from the hopper 12 in a continuous stream to the crusher 13 and is passed thence to the discharge conveyor 3 from which it falls to the delivery site. The superstructure is then turned through an angle corresponding to the width of the cut of the shovel 21, and the shovel 21 is prepared for the next cycle. The area of delivery can be adjusted by raising or lowering the discharge conveyor 3 by means of the winch 6 and by turning the discharge conveyor 3 with the base frame 2 independently of the supersetructure.

The shovel excavator according to this invention delivers the cut material from the shovel to the delivery site without wasting time while the shovel together with the superstructure turns above the delivery site. The performance of the excavator is not limited by the capacity of the shovel because the excavated material is delivered from the shovel by a conveyor. The hopper provided in the conveying line maintains continuous delivery of the excavated material. The crusher makes it possible to adjust the lump size of the delivered material. The range of delivery is not limited by the dimensions of the shovel assembly, but by the dimensions of the discharge conveyor. It is possible to load the material to a conveyance directly from the excavator.

We claim:
1. A shovel excavator comprising, in combination:
  (a) truck means;
  (b) base means rotatable on said truck means about a vertically extending axis;
  (c) a superstructure mounted on said base means, said superstructure extending upward from said base means and being rotatable thereon about a vertically extending axis;
  (d) an elongated discharge conveyor having one end portion pivotally connected to said base means;
  (e) winch means on said superstructure for pivoting said conveyor on said base means;
  (f) an elongated jib mounted on said superstructure and extending therefrom in an upward and forward direction;
  (g) an arm having one end portion pivotally attached to said superstructure, and another end portion normally upwardly spaced from said one end portion;
  (h) an elongated control beam mounted on a portion of said superstructure for longitudinal sliding movement in a forward and backward direction and for pivoting movement in a vertically extending plane, the forward end of said beam being pivotally connected to said other end portion of said arm;
  (i) an elongated boom having one end portion pivotally connected to said other end portion of said arm and a free end portion normally spaced from said one portion of said boom in a forward direction;
  (j) a shovel on said free end portion;
  (k) means for actuating pivoting movement of said boom about said other end portion of said arm;
  (l) means for actuating forward sliding movement of said control beam on said portion of said superstructure;
  (m) hopper means on a portion of said superstructure downwardly spaced from said other end portion of said arm for delivering intermittently received excavated material to said discharge conveyor in a continuous stream;
  (n) a chute having two telescopingly engaged portions respectively secured to said hopper and to said other end portion of said arm; and
  (o) conveyor means extending on said boom from said shovel to said other end portion of said arm for conveying material excavated by said shovel to said chute while said shovel moves upward from a position downwardly spaced from said other end portion of said arm.

2. An excavator as set forth in claim 1, further comprising crusher means interposed between said hopper means and said discharge conveyor.

3. An excavator as set forth in claim 1, further comprising a shaft pivotally connecting said other end portion of said arm, said control beam, and said boom.

References Cited by the Examiner

UNITED STATES PATENTS

| | | | |
|---|---|---|---|
| 766,888 | 8/04 | Miller | 214—90 |
| 1,443,353 | 1/23 | Ferris | 214—134 |
| 1,825,956 | 10/31 | Huennekens | 214—90 |
| 2,072,495 | 3/37 | Browner | 214—90 |
| 2,139,254 | 12/38 | Bixby | 214—136 |
| 2,139,255 | 12/38 | Bixby | 214—136 |

FOREIGN PATENTS 11,611   5/09   Great Britain.

HUGO O. SCHULZ, *Primary Examiner.*